UNITED STATES PATENT OFFICE.

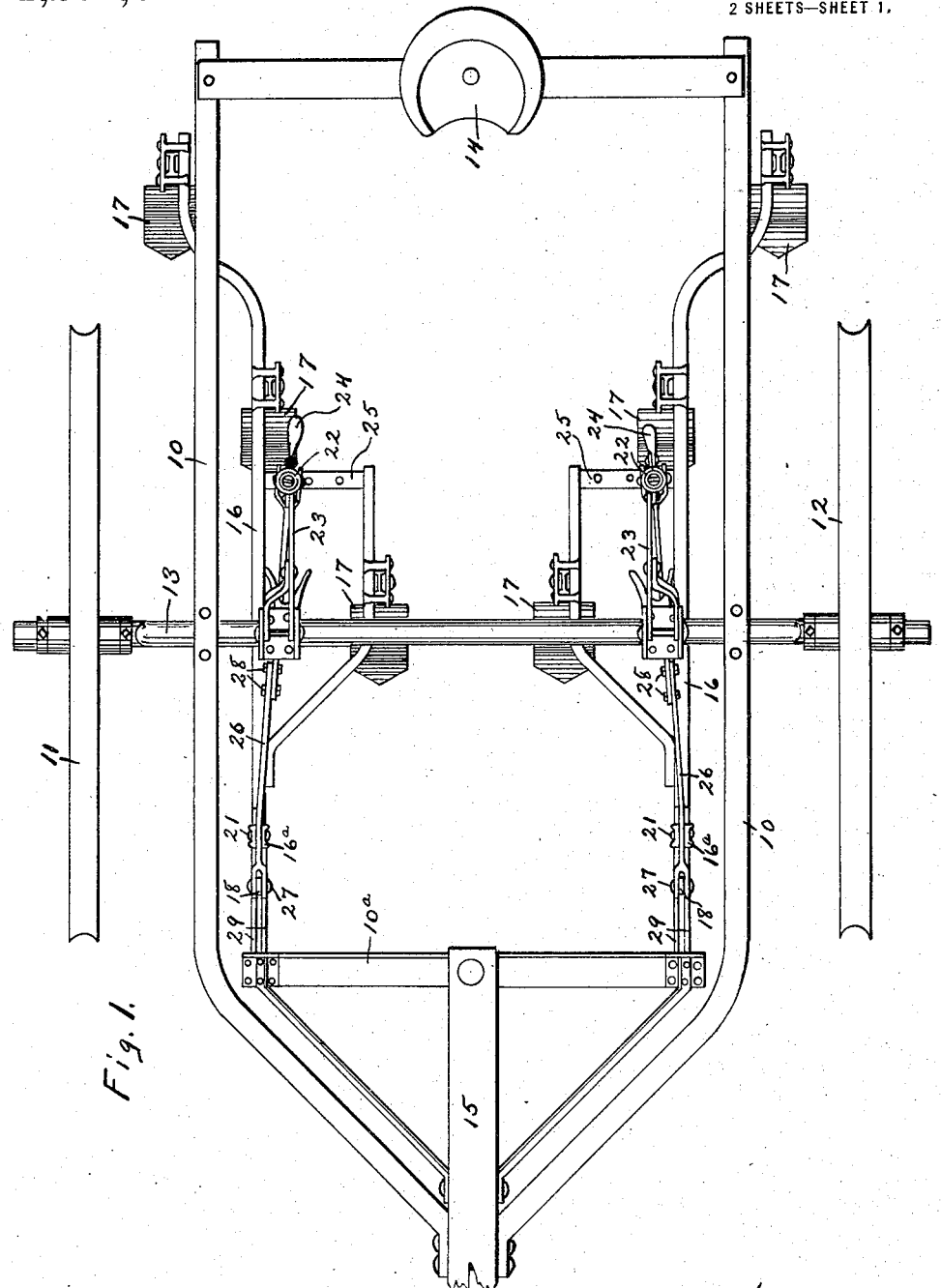

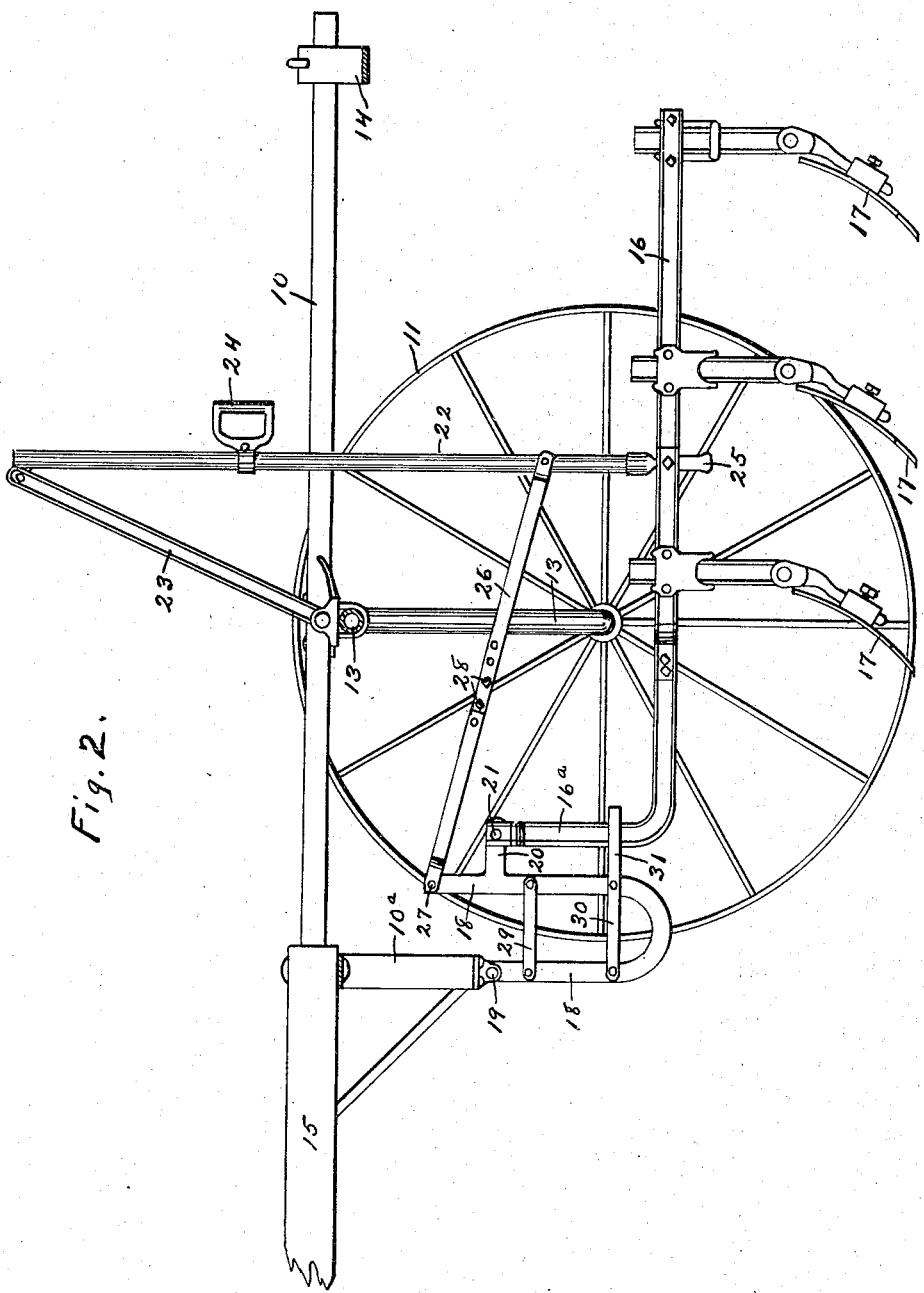

RAY L. SPENCER, OF PEOPLES TOWNSHIP, BOONE COUNTY, IOWA.

DEPTH-EQUALIZING SHOVEL-BEAM ATTACHMENT FOR CULTIVATORS.

1,204,603. Specification of Letters Patent. Patented Nov. 14, 1916.

Application filed July 17, 1916. Serial No. 109,672.

*To all whom it may concern:*

Be it known that I, RAY L. SPENCER, a citizen of the United States of America, and resident of Peoples township, Boone county, Iowa, have invented a new and useful Depth-Equalizing Shovel-Beam Attachment for Cultivators, of which the following is a specification.

The object of this invention is to provide means for maintaining the shovel beams of a cultivator in horizontal position during vertical movement of the shovels.

A further object of this invention is to provide improved means for leveling and keeping level the shovels of a cultivator during vertical movement.

A further object of this invention is to provide an improved method of pivotally suspending the shovel beams of a cultivator.

My invention consists in the construction, arrangement and combination of elements hereinafter set forth, pointed out in my claims and illustrated by the accompanying drawing, in which—

Figure 1 is a plan of a portion of a cultivator showing my improvement. Fig. 2 is a longitudinal section of the same.

In the construction of the device as shown the numeral 10 designates generally the frame of a cultivator of any desired and suitable construction, said frame being supported by wheels 11, 12 pivoted on a drop axle 13, and provided with a driver's seat 14 and draft tongue 15. Shovel beams 16 are provided and are laterally spaced and extend longitudinally of and beneath the frame 10, and each carries longitudinally spaced cultivating devices such as shovels 17. Each beam 16 is horizontal throughout a greater portion of its length when in normal cultivating position, and is formed at its forward end with an upturned post 16ª which in normal cultivator construction is pivoted at its upper end to a forward crossbar 10ª of the frame. In the present construction the shovel beams 16 are foreshortened and the upright posts 16ª are rearward of the vertical plane of the forward crossbar 10ª. U-shaped hangers 18 are provided and are pivoted at their forward upper ends or at the tops of their forward arms, by bolts 19, to the forward frame member 10ª, at the place of the normal pivoting of the shovel beams. The U-shaped hangers 18 extend rearwardly and have rearwardly extending arms or lugs 20 formed on their upper rear ends, in the same horizontal plane as the pivots 19, and the upper ends of the posts 16ª are pivoted by bolts 21 to the rear ends of said arms. Thus the shovel beams are pivotally connected in the same horizontal plane but to the rear of their normal pivoting, and the provision of the rearwardly extending arms or lugs 20 permits a tilting of the hangers 18 without interfering with or striking the posts 16ª, and permits said posts to maintain their upright position.

The usual upright suspension rods 22 are employed and are pivotally connected in a common manner at their lower ends to and intermediate of the ends of the shovel beams 16, and extend above the frame 10. The upper ends of the suspension rods 22 are pivotally connected by forwardly and downwardly extending links 23 to the frame 10 adjacent the axle 13. Hand holds 24 are provided on the suspension rods 22, and stirrups 25 on the beams 16, for manually moving said shovel beams laterally and vertically in a common manner.

The rear members of the U-shaped hangers 18 are extended above the plane of the pivots 19, 21, and links 26 are pivotally connected at their forward ends thereto by bolts 27; said links extending rearwardly and somewhat downwardly and being connected at their rear ends pivotally to the suspension rods 22. The links 27 preferably are adjustable as to length, being formed in two pieces which overlap and are connected by bolts 28.

Straps 29 connect and brace upper parts of the two members or arms of each U-shaped hanger 18, and said straps preferably are double, one on either side of the hanger. Similar straps 30 are provided for the lower portions of the hangers, and said lowermost straps are extended rearwardly of the rear members of the hangers, to form spaced guides 31 on opposite sides of and in sliding relation to the posts 16ª, and tending to keep said posts in the same vertical plane as the hangers.

In practical use a lifting motion applied to the suspension rods 22 through the hand holds 24 is communicated to lift the central portions of the beams 16, in a common manner. At the same time the upper ends of the suspension rods 22 are moved forwardly by articulation of the links 23. This upward and forward movement of the suspension rods 22 is communicated as a pushing motion, forwardly and upwardly, on the links 26, which causes a tilting of the hangers 18 on the pivots 19. Such movement of the hangers 18 causes an upward, as well as a forward, movement of the arms or lugs 20, and a consequent forward and upward movement of the posts 16ª and forward ends of the shovel beams. This movement of the forward end of the shovel beams is equal to the movement of the intermediate and rear portions of said beams, so that said beams are maintained in horizontal plane regardless of the vertical movement thereof. A similar result is achieved in respect of downward movement of the shovel beams at their central or rear portions, through force applied to them by the hand holds 24 or stirrups 25, or from any other cause, such movement being communicated through the suspension rods 22, links 26, hangers 18 and lugs 20 to the posts 16ª and forward ends of the shovel beams. As the shovel beams are thus maintained at all times in horizontal planes, regardless of their vertical movement, it follows that the bottoms are always in the same plane, or at least their vertical movement is always in the same ratio, and the desired relative penetration into the soil is maintained. This result was not possible in the construction wherein the forward ends of the shovel beams were pivoted directly to the frame, and draft was applied to the rear ends to swing them through arcs on such pivots.

The pivotal connection of the suspension rods 22 and hanger 18 to the frame, and their further pivotal connection to one another through the link 26, causes said members 22 and 18 to maintain parallel relations at all times, so that their action on spaced points of the beam 16 is equal and in the same direction.

I claim as my invention:

1. A depth-equalizing shovel-beam attachment for cultivators, comprising a U-shaped hanger pivoted by one arm to the cultivator frame, a shovel beam pivoted at its forward end to the other arm of said hanger, a suspension rod pivoted to said beam at the rear of said hanger, a rock lever pivotally connecting the upper end of said suspension rod to the cultivator frame, and a link pivotally connecting the lower portion of said suspension rod to said hanger.

2. A depth-equalizing shovel-beam attachment for cultivators, comprising a U-shaped hanger having one arm pivoted to the cultivator frame, a shovel beam pivoted at its forward end to the other arm of said hanger, a suspension rod pivoted at its lower end to said beam at the rear of said hanger, a rock lever pivotally connecting the upper end of said suspension rod to the cultivator frame, and a link pivotally connecting the lower portion of said suspension rod to said hanger, said latter link being adjustable as to length.

3. A depth-equalizing shovel-beam attachment for cultivators, comprising a hanger pivoted at its forward side to the cultivator frame, a shovel beam having an upturned forward end pivotally connected to and at the rear of the transverse median line of said hanger, a suspension rod connected to said beam at the rear of said hanger, a rock lever pivotally connecting the upper end of said suspension rod to the frame, and a link pivotally connecting the lower end of said suspension rod to said hanger above the pivot of said shovel beam.

4. A depth-equalizing shovel-beam attachment for cultivators, comprising a hanger pivoted at its forward side to the cultivator frame, said hanger being formed with a rearwardly projecting lug on its rear side, a shovel beam having an upturned forward end pivoted to the rearwardly extending lug of said hanger, a suspension rod connected to said beam and spaced rearwardly from the upturned end thereof, a rock lever pivotally connecting the upper end of said suspension rod to the frame, and a link pivotally connecting the lower end of said suspension rod to the rear side of said hanger above said lug.

5. A depth-equalizing shovel-beam attachment for cultivators, comprising a hanger pivoted at its forward side to the cultivator frame, a shovel beam formed with an upturned forward end having pivotal connections to the rear side of said hanger, a suspension rod connected to said beam at the rear of said hanger and materially spaced from said upturned end, a rock lever pivotally connecting the upper end of said suspension rod to said frame, a link pivotally connecting the lower end of said suspension rod to said hanger, and spaced guides on the lower portion of said hanger slidingly embracing the upturned end of said beam.

6. A depth-equalizing shovel-beam attachment for cultivators, comprising laterally spaced hangers pivoted at their forward sides to the cultivator frame, spaced shovel beams having upturned forward ends pivotally connected to and at the rear of the transverse median line of said hangers, suspension rods connected to said beams at the rear of said hangers, rock levers pivotally connecting the upper ends of said suspension rods to the frame, and links pivotally connecting the lower end of said suspension rods to said hangers above the pivots of said shovel beams.

7. An article of manufacture, comprising a shovel-beam connection of U-shape, the rear arm thereof being longer than the forward arm and formed with a rearwardly projecting lug adjacent to but spaced from its upper end and in substantially the same horizontal plane as the top of the forward arm, and braces between the arms of the U.

Signed by me at Bouton, Dallas county, Iowa, this 10th day of July, 1916.

RAY L. SPENCER.

Copies of this patent may be obtained for five cents each, by addressing the "Commissioner of Patents, Washington, D. C."